United States Patent

Sprafke

[11] Patent Number: 5,128,803
[45] Date of Patent: Jul. 7, 1992

[54] COMBAT VEHICLE WITH A HATCHWAY IN ITS ARMORED ROOF AND INCLUDING A SYSTEM OF PERISCOPES

[75] Inventor: Uwe Sprafke, Schauenberg, Fed. Rep. of Germany

[73] Assignee: Wegmann & Co. GmbH, Kassel, Fed. Rep. of Germany

[21] Appl. No.: 696,814

[22] Filed: May 7, 1991

[30] Foreign Application Priority Data

May 12, 1990 [DE] Fed. Rep. of Germany ....... 4015346

[51] Int. Cl.$^5$ .................. G02B 23/08; G02B 23/16; F41H 5/26
[52] U.S. Cl. .................. 359/403; 359/402; 89/36.14
[58] Field of Search .................. 350/540–544, 350/539; 89/36.14

[56] References Cited

U.S. PATENT DOCUMENTS

| | | | |
|---|---|---|---|
| 978,368 | 12/1910 | Grubb | 350/543 |
| 1,708,746 | 4/1929 | Von Hofe | 350/541 |
| 3,013,471 | 12/1961 | Clave et al. | 350/540 |
| 3,482,897 | 12/1969 | Hopp | 350/540 |
| 4,646,616 | 3/1987 | Svensson | 89/36.14 |
| 4,688,905 | 8/1987 | Okamura | 350/541 |
| 4,934,246 | 6/1990 | Benson et al. | 350/540 |

FOREIGN PATENT DOCUMENTS 535198 10/1931 Fed. Rep. of Germany ...... 350/544

Primary Examiner—Jon W. Henry
Attorney, Agent, or Firm—Sprung Horn Kramer & Woods

[57] ABSTRACT

A combat vehicle, especially a military tank, has a hatchway in its armored roof and periscopes in the immediate vicinity of the hatchway. Each periscope has an ocular inside the vehicle and an objective outside it. A channel that accommodates the optical path extends between them. The channel extends through a protective block of neutral material on the roof of the vehicle. At least one section of the channel is completely occupied by optical glass. The ocular extends directly out of that section although the objective rests on the top of the block. The block can consist of a stack of separate sheets. The objective can have an outlook aperture and a direct-view aperture. The mirror in the objective can be semitransparent or moved out of the optical path.

15 Claims, 3 Drawing Sheets

COMBAT VEHICLE WITH A HATCHWAY IN ITS ARMORED ROOF AND INCLUDING A SYSTEM OF PERISCOPES

BACKGROUND OF THE INVENTION

The invention concerns a combat vehicle, especially a military tank, with a hatchway in its armored roof and with periscopes in the immediate vicinity of the hatchway, each periscope having an ocular inside the vehicle and an objective outside it and a channel that accommodates the optical path extending between them.

Combat vehicles with a system of periscopes of this type are in themselves known (cf. e.g. DE OS 3 305 883 A1).

It has been demonstrated that the exposure of combat vehicles to attack from the air in particular confronts defensive technology with a number of serious problems. Both reactive and passive defensive measures are possible against hollow charges, although the former is more effective. Due to its structure, however, reactive defensive measures cannot be installed in narrow intervals in the vehicle, due to the periscopes for example, leaving these areas unprotected.

Another problem is represented by the periscopes themselves. Known embodiments consist, as has already been mentioned herein, of an objective outside the tank connected by a channel that accommodates the optical path to an ocular inside the tank. Most periscopes are made out of plastic to save weight. They accordingly themselves expand the unprotected areas on the tank.

SUMMARY OF THE INVENTION

The object of the invention is to improve a combat vehicle with the aforesaid characteristics to the extent that positioning the periscopes in the immediate vicinity of a hatchway does not result in unprotected areas.

This object is attained in accordance with the invention in that the channel extends through a protective block of neutral material on the roof of the vehicle, in that at least one section of the channel is completely occupied by optical glass, and in that the ocular extends directly out of that section although the objective rests on the top of the protective block.

The block itself can be made out of optical glass and the glass in the channel can be in one piece with the block. The block can, however, be made out of a different kind of material, in which case the glass in the channel will be in one piece with the ocular.

The basic principle of the invention is that, with the channel in its own protective block and at least one section containing optical glass, transparent glass, that is, there will be no unprotected areas. It has been demonstrated that filling at least one section of the channel with optical glass will effectively protect it from hollow charges.

It will be of particular advantage for the block or blocks to be composed of a stack of individual sheets.

In this event, when the sheets are made out of a material, ceramic for example, other than the glass in the channel, the sheets can have perforations that coincide to create a channel when they are bonded together. It is, however, also possible for the sheets themselves to be made of glass, transparent bullet-proof glass for example. In this event, no perforations through the sheets will be necessary and the ocular will extend directly out of the lowermost sheet. Constructing the block out of sheets makes it possible to attain any thickness necessary for protection, and the stack can be high enough to raise the objective to the prescribed level above the edge of the hatchway. The result is that, when the hatchway is open, it will be possible to look directly through openings in the objectives, and the observer's head will still be at least to some extent protected from missiles by the block.

As will be described later herein with reference to specific embodiments, direct viewing through the openings in the objective will be facilitated if the mirrors in the objectives can be shifted in and out of the optical path or if they are semitransparent in a known way and constitute part for example of an in-itself known beam splitter.

Embodiments of a combat vehicle in accordance with the invention will now be specified with reference to the attached drawings, wherein

DETAILED DESCRIPTION OF THE INVENTION

Figure 1:
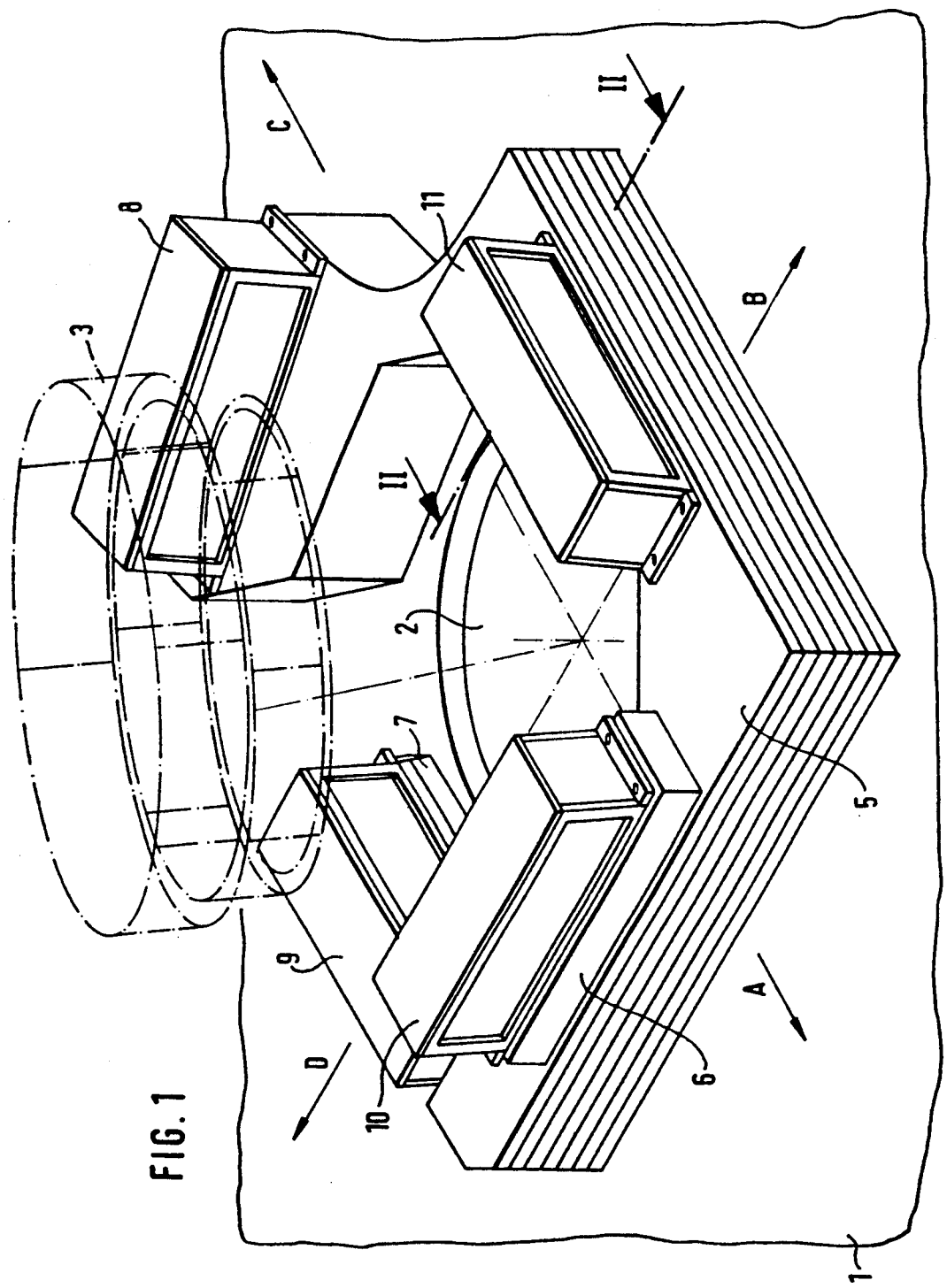
FIG. 1 is a highly simplified perspective view of part of the roof of a military tank with periscopes distributed around a hatchway.

FIG. 1 illustrates the vicinity of a hatchway 2 in the roof 1 of an otherwise unillustrated military tank. The hatchway can be secured with a hatch 3, illustrated with broken lines, that is attached to roof 1 by unillustrated lift-and-pivot mechanisms. The hatch 3 illustrated in FIG. 1 has been partly lifted but not pivoted or swung out of the way.

Four periscopes are distributed around hatchway 2.

Figure 2:
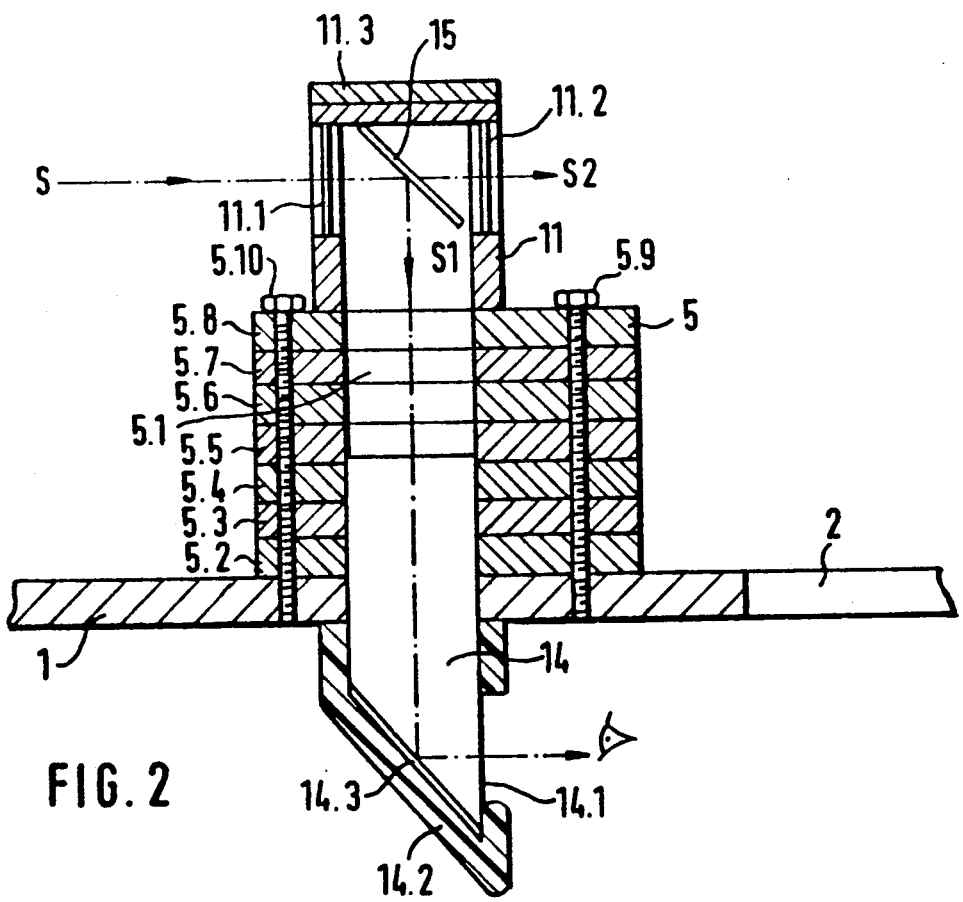
FIG. 2 is a vertical section along the line II—II in FIG. 1.

FIG. 1 illustrates only objectives 8 through 11, and FIG. 2 only objective 11 and, inside the tank, ocular 14. Every periscope comprises a channel that extends through the roof between objectives 8 through 11 and the ocular. Each channel extends through a protective block 5 of neutral material mounted on roof 1. As will be evident from FIG. 1, block 5 surrounds hatchway 2 all the way up on three sides in directions A, B, and C. Objectives 8 and 11 are mounted directly on block 5, whereas objective 10 is mounted on a intermediate 6 and is accordingly higher. On the remaining side of hatchway 2 in direction D is a lower protective block 7, which objective 9 is mounted on. Block 5 is composed, as will be specified later herein, of a stack of eight sheets, whereas lower block 7 is similarly constructed out of only two sheets, which may optionally be in one piece with the corresponding sheets in block 5.

The structure of the periscope with objective 11 and ocular 14 and mounted on block 5 will now be specified. The other periscopes are similar.

The block 5 mounted on roof 1 is composed of individually stacked sheets 5.2 to 5.8, which are either secured together as illustrated with threaded bolts 5.9 and 5.10 or are accommodated in a special housing and screwed onto the roof as a single assembly. Constructed in block 5 is an optical channel 5.1, which has an ocular 14 of optical glass extending into it from inside the tank. Channel 5.1 is occasioned by the presence of appropriate perforations in sheets 5.2 through 5.8. It is of course also possible for the sheets not to have perforations and accordingly to be made out of transparent bullet-proof glass, resulting in a channel completely occupied by optical glass and accordingly already in one piece with the block material. In this case the ocular will be mounted in an unillustrated way directly against the bottom of the lowermost sheet.

Ocular 14 has an intake aperture 14.1 and a protective cap 14.2. Objective 11 is cylindrical and stands on the upper surface of block 5, to which it is rigidly secured. The outward-facing front of objective 11 has another outlook aperture 11.1 and its rear which faces hatchway 2, has a direct-view aperture 11.2. Each aperture is protected with a disk of transparent material. The top of objective 11 is tightly sealed with a cap 11.3. A mirror 15 is accommodated in the objective at an angle of 45° to the horizontal, reflecting the beam entering from direction S down through channel 5.1 in direction S1, where it encounters another mirror 14.3 accommodated in ocular 14 at an angle of 135° to the horizontal, which reflects it to intake aperture 14.1.

A semitransparent mirror 15 allows another optical path extending in in direction S, through the mirror, and in direction S2 to direct-view aperture 11.2. In this case observations can be made at any time through either outlook aperture 11.1 or through direct-view aperture 11.2.

Figure 3:
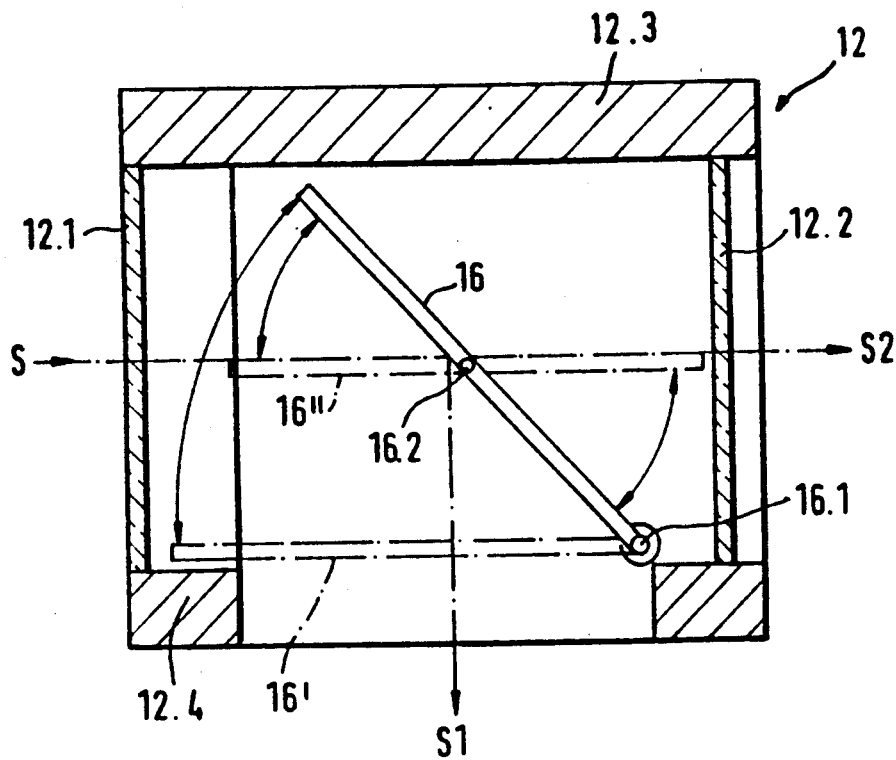
FIG. 3 is a vertical section through part of one version of the objective in the embodiment illustrated in FIG. 2.

Am opaque mirror 15 must either be designed to allow a view past it from direct-view aperture 11.2 to outlook aperture 11.1 or it must to some extent be removable out of the periscope's optical path. In the embodiment illustrated in FIG. 3, an objective 12 is, as in the embodiment illustrated in FIG. 2, mounted on a protective block 5. For simplicity's sake only objective 12 and not the block is illustrated. The objective has a outlook aperture 12.1 protected by a disk and a direct-view aperture 12.2, also protected by a disk. The top of cylindrical objective 12 is protected by a cap 12.3. A mirror 16 can assume two positions inside objective 12. In the first position, represented by the continuous lines, it is at an angle of 45° to the horizontal and accordingly reflects a beam entering from direction S down in direction S1.

The mirror 16 in one version of this embodiment pivots down at the bottom around a horizontal axis 16.1 into the position 16' indicated by the dot and dash lines, in which it rests against a stop 12.4. When the mirror is in this position, the beam entering in direction S continues in direction S2, and it is possible to look directly through from direct-view aperture 12.2 to outlook aperture 12.1.

The same effect can be achieved in another version of this embodiment when mirror 16 pivots around a horizontal axis 16.2 halfway up into another position 16'' that is also indicted by dot-and-dash lines. When the mirror is in this position, the beam arriving in direction S also continues straight in direction S2.

Figure 4:
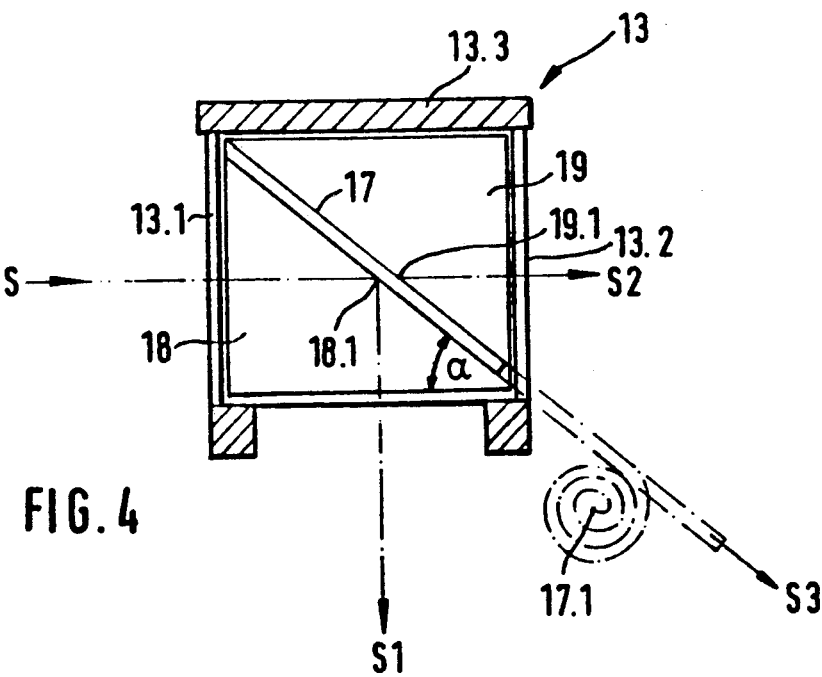
FIG. 4 is a section like that in FIG. 3 through another version of the objective in the embodiment illustrated in FIG. 2.

FIG. 4 illustrates another embodiment of an objective 13. It rests on a block 5. Its top is protected with a cap 13.3 and it has an outlook aperture 13.1 and a direct-view aperture 13.2. A mirror 17 is positioned inside the objective and reflects the beam coming in in direction S down in direction S1 as previously described herein at an angle $\alpha = 45°$. This mirror 17 is positioned between two prisms 18 and 19 of optical glass. Their bases 18.1 and 19.1 are parallel and separate, leaving space for the mirror. One advantage of this embodiment is that objective mirror. Objective 13 is also completely occupied by optical glass and accordingly provides more effective protection. The embodiment illustrated in FIG. 4 can also have various versions allowing the beam to continue straight through to the direct-view aperture or be reflected down to the ocular.

In one version, mirror 17 is again semitransparent, and optical paths S-S1 and S-S2 are both possible.

In another version, mirror 17 is a rigid sheet that can be removed from between prisms 18 and 19 in direction S3, interrupting path S-S1 and establishing path S-S2.

Finally it is also possible for mirror 17 to be a flexible sheet that rolls up around a horizontal axis 17.1 of rotation, interrupting path S-S1 and establishing path S-S2.

Figure 5:
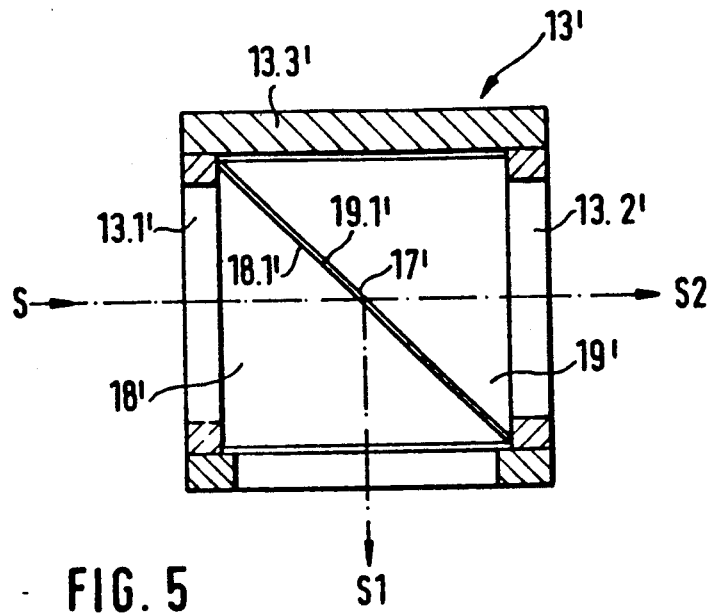
FIG. 5 is a section like that in FIG. 3 of a version of the objective illustrated in FIG. 2 in the form of a beam splitter.

FIG. 5 illustrates another version of the objective illustrated in FIG. 4. The same reference numbers plus a prime sign are employed for similar components.

The mirror 17' in the embodiment illustrated in FIG. 5 is as previously mentioned semitransparent and is part of a conventional beam splitter. Objective 13' has an outlook aperture 13.1', a direct-view aperture 13.2', and a cap 13.3' and accommodates two prisms 18' and 19'. The bases 18.1' and 19.1' of the prisms are in direct contact and silvered to create the semitransparent mirror. Both optical paths S-S1 and S-S2 are also present in this embodiment.

What is claimed is:

1. A combat vehicle having an armored roof and a hatchway therein and a system of periscopes mounted around the hatchway, wherein each periscope comprises an ocular positioned inside the vehicle and an objective positioned outside the vehicle and means forming a channel defining an optical path between the ocular and the objective, wherein the means forming the channel comprises a protective block of passive material disposed on the roof of the vehicle, optical glass completely filling in at least one section of the channel and wherein the ocular extends directly out of said at least one section and the objective rests on a top of the block.

2. The combat vehicle as in claim 1, wherein for each periscope the protective block comprises a stack of individual sheets.

3. The combat vehicle as in claim 1 or 2, wherein for each periscope the block is comprised of optical glass and the glass in the channel is in one piece with the block.

4. The combat vehicle as in claim 1, wherein for each periscope the glass in the channel is in one piece with the ocular.

5. The combat vehicle as in claim 4, wherein for each periscope the optical-glass ocular is inserted into the channel from inside the vehicle.

6. The combat vehicle as in claim 1, wherein each protective block is configured to at least partly surround the hatchway, with the objectives of a plurality of periscope mounted on it and facing various directions.

7. The combat vehicle as in claim 1, wherein for each periscope the objective is configured as a cylinder and rests on the protective block, wherein the cylinder is closed at the top and has an outward-facing outlook aperture in the side and a direct-view aperture facing the hatchway, and accommodates a mirror in the optical path of the periscope.

8. The combat vehicle as in claim 7, wherein for each periscope the mirror is semitransparent and wherein the optical path includes one section which extends from the outlook aperture in the objective to an intake aperture in the ocular and another section which extends from the outlook aperture of the objective to a direct-view aperture.

9. The combat vehicle as in claim 8, wherein for each periscope the mirror pivots around a horizontal axis out of a position in which it acts as a reflector in the section of the optical path from the outlook aperture in the objective to the intake aperture in the ocular and into a position in which it allows a direct view from a direct-view aperture to the outlook aperture on the objective.

10. The combat vehicle as in claim 7, wherein for each periscope two optical-glass prisms are accommodated in the objective with their bases parallel and with a prescribed distance between them and extending out at a prescribed angle to the horizontal with the mirror accommodated between them.

11. The combat vehicle as in claim 10, wherein for each periscope the mirror is inserted between the prisms.

12. The combat vehicle as in claim 11, wherein for each periscope the mirror is a rigid sheet.

13. The combat vehicle as in claim 11, wherein for each periscope the mirror is a flexible sheet and rolls up.

14. The combat vehicle as in claim 10, wherein for each periscope the mirror and prisms form a beam splitter.

15. The combat vehicle as in claim 2, wherein for each periscope the individual sheets are composed of a ceramic.

* * * * *